United States Patent Office.

HENRY HAUER, OF PHILADELPHIA, PENNSYLVANIA, ADMINISTRATOR OF THE ESTATE OF LOUIS BAUHOEFER.

*Letters Patent No.* 59,342, *dated November* 6, 1866; *reissue No.* 3,283, *dated February* 2, 1869.

B.

IMPROVED ARTICLE OF PREPARED CORK FOR THE MANUFACTURE OF MATTRESSES, &c

The Schedule referred to in these Letters Patent and making part of the same.

*To all whom it may concern:*

Be it known that LOUIS BAUHOEFER, late of Philadelphia, Pennsylvania, deceased, did invent a Method of Treating Cork for Mattresses, &c., for which Letters Patent of the United States were granted to him on the 6th day of November, 1866; and I, HENRY HAUER, executor and administrator of the estate of the said LOUIS BAUHOEFER, do hereby declare the following to be a full, clear, and exact description of that part of the said invention which consists of a new article of manufacture, composed of particles of cork, roasted, charred, or partly burnt, so as to render the material soft and elastic, and better adapted to the filling and packing of mattresses, and for other like useful purposes, than crude cork.

In carrying out the invention, the cork must be first broken, granulated, cut into shavings, or otherwise subdivided, the sizes of the pieces depending upon the use to which they have to be applied.

In order to char or roast the cork, it may be placed in a metal casing caused to revolve over a fire, and the casing may be perforated, so that the products of combustion can have access to and fumigate the cork, the character of which is changed by the roasting, or partial burning, or charring, to which it is subjected, for the resinous, gummy, and other matter, which renders crude cork comparatively rigid and brittle, is expelled by the heat, leaving the cork light and elastic, and especially applicable to the stuffing of cushions, mattresses, and useful for other packing-purposes.

The cork may be subjected to the fumes or vapors arising from burning or heated aromatic substances, so as to prevent the lodgment of insects.

I claim as the invention of the late LOUIS BAUHOEFER, and desire to secure by Letters Patent, as a new manufacture, to be used for stuffing mattresses, and other useful purposes—

Particles of cork, roasted, charred, or partly burnt, as set forth, for the purpose specified.

In testimony whereof, I have signed my name to this specification, before two subscribing witnesses.

HENRY HAUER.

Witnesses:

HENRY HOWSON,

JOHN WHITE.